(12) United States Patent
Nansaka et al.

(10) Patent No.: US 7,819,929 B2
(45) Date of Patent: Oct. 26, 2010

(54) SEALED BATTERY AND MANUFACTURING METHOD THEREFOR

(75) Inventors: Kenji Nansaka, Habikino (JP); Yasutomo Taniguchi, Moriguchi (JP); Yasuhiro Yamauchi, Moriguchi (JP); Toshiyuki Nohma, Moriguchi (JP); Kenji Inagaki, Moriguchi (JP); Satoshi Yoshida, Kurashiki (JP); Takashi Kondou, Moriguchi (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 0 days.

(21) Appl. No.: 12/145,039

(22) Filed: Jun. 24, 2008

(65) Prior Publication Data

US 2009/0004561 A1    Jan. 1, 2009

(30) Foreign Application Priority Data

Jun. 27, 2007    (JP)    ............................. 2007-168804
Sep. 28, 2007    (JP)    ............................. 2007-252823

(51) Int. Cl.
   *H01M 2/22*    (2006.01)
   *H01M 2/26*    (2006.01)
(52) U.S. Cl. ........................ 29/623.1; 429/185; 429/211
(58) Field of Classification Search ................. 429/185, 429/211; 29/623.1
See application file for complete search history.

(56) References Cited

U.S. PATENT DOCUMENTS 4,125,680 A * 11/1978 Shropshire et al. ............. 429/4

5,985,479 A * 11/1999 Boolish et al. ................ 429/56
2005/0118501 A1* 6/2005 Hashimoto et al. .......... 429/180
2007/0117009 A1* 5/2007 Yamauchi et al. ........... 429/160

FOREIGN PATENT DOCUMENTS

| JP | 2001-160387 A | 6/2001 |
| JP | 2002-8708 A | 1/2002 |
| JP | 2006-310254 A | 11/2006 |
| JP | 2007-53002 A | 3/2007 |

OTHER PUBLICATIONS

"Weld-In Tank Shell", Anderson Instrument Company, Fultonville, NY. Aug. 1999.*

* cited by examiner

*Primary Examiner*—Jonathan Crepeau
*Assistant Examiner*—Kenneth Douyette
(74) *Attorney, Agent, or Firm*—Westerman, Hattori, Daniels & Adrian, LLP

(57) ABSTRACT

The present invention's manufacturing method for a sealed battery includes: a process whereby a sealed battery application electrode assembly 11 is formed that has multiple positive electrode substrate exposed portions 14 at one end and multiple negative electrode substrate exposed portions 15 at the other end; a process whereby the negative electrode collector $18_1$ and negative electrode collector receiving part $18_3$ are brought against both surfaces of the part to be welded on at least the negative electrode substrate exposed portions 15, with tape 23a constituted of thermodeposited resin and having an opening $23_1$ in the center being interposed; and a process whereby resistance welding is effected by passing current between the negative electrode collector $18_1$ and negative electrode collector receiving part $18_3$ positioned at the two sides.

13 Claims, 10 Drawing Sheets

SEALED BATTERY AND MANUFACTURING METHOD THEREFOR

TECHNICAL FIELD

The present invention relates to a sealed battery and manufacturing method therefor. More particularly it relates to a sealed battery which has exposed portions of positive electrode substrates at one end and of negative electrode substrates at the other, which is high-reliability, and in which, since spatter occurring when the collectors are resistance welded to the substrates is prevented from moving into the electrode assembly interior, few internal short-circuits occur; and to a manufacturing method therefor.

RELATED ART

Curbs on emissions of carbon dioxide and other substances have been strengthened against a background of growing movements for environmental protection, and in the automobile world there is now vigorous development of electric vehicles (EVs) and hybrid electric vehicles (HEVs) alongside vehicles using fossil fuels such as gasoline, diesel oil and natural gas. In addition, the soaring prices of fossil fuels in recent years has acted to spur on the development of EVs, HEVs and the like.

The batteries used for such EVs, HEVs and the like are generally nickel-oxygen secondary batteries or lithium ion secondary batteries. But what is now being required of such vehicles is not only environmental compatibility, but also basic performance as automobiles—in other words, elevated driving capabilities. Therefore it is necessary not simply to enlarge the battery capacity, but also to increase the battery output, which exerts large effects on an automobile's acceleration and hill-climbing performances. However, when discharge of high output is implemented, large current will flow in the battery, and as a result there will be large heat-up due to contact resistance between the substrates and the collectors, which are the generation elements. Thus, batteries for EVs and HEVs are required not only to be large-sized and large capacity, but also to afford large current. Accordingly, in order to prevent electricity loss inside the battery and thereby reduce heat emission, many improvements have been carried out with regard to lowering the internal resistance by preventing welding faults between the substrates and collectors, which are the generation elements.

There exist the methods of mechanical caulking, welding and the like for electrically joining the substrates and collectors, which are the generation elements. Welding, which is joining by fusion, is appropriate as the electrical collection method for batteries of which high output is required. Also, in order to effect low resistance, the material used for the negative electrode assembly of a lithium ion secondary battery is copper or copper alloy, which however have the characteristics of low electrical resistance and high thermal conductivity, so that extremely large amounts of energy are required in order to weld them.

The following methods have long been known as methods for welding together the substrates and collectors which are the generation elements:

1) Laser welding (see JP-A-2001-160387)
2) Ultrasonic welding (see JP-A-2007-053002)
3) Resistance welding (see JP-A-2006-310254)

With the laser welding method, a high-energy laser beam is required because the reflectivity of the copper or copper alloy welded material with respect to the YAG (yttrium-aluminum garnet) laser light that is widely used to weld metals is high—around 90%. There also exist the problems that when copper or copper alloy is laser-welded, the weldability varies greatly depending on the condition of the surfaces, and that the occurrence of spatter is unavoidable, as in laser welding of other materials.

With ultrasonic welding too, large amounts of energy are required because the thermal conductivity of the copper or copper alloy welded material is high. Also, the negative electrode activate material may be dislodged by the ultrasonic vibration during welding. Accordingly, in the invention disclosed in JP-A-2007-053002, the electrode assembly, which is the generation element, is compressed during ultrasonic welding, so that dislodged negative electrode active material will not enter inside it.

Further, with resistance welding, due to the copper or copper alloy welded material having low electrical resistance and high thermal conductivity there exist the problems that large current needs to be input in a short time, that fusion-joining of the collectors and the bolt poles, which are of the same material as the collectors, sometimes occurs during welding, and that melting or spark generation may occur at places other than the welds.

Thus, the three welding methods have their merits and drawbacks. In the interests of productivity and economy however, the resistance welding method, which has long been used as a method for welding between metals, will preferably be employed. But, especially in order to resistance-weld the copper collectors to the substrates of copper or copper alloy in the electrode assembly (see JP-A-2002-008708) of EV and HEV application sealed batteries, which have exposed portions of positive electrode substrates at one end and of negative electrode substrates at the other, a great deal of welding energy is necessary in order to effect a firm weld, since the electrode assembly has a large number of stacked layers. Moreover, when the welding energy is rendered large for resistance welding, occurrence of spatter increases, as does the probability of internal short circuits resulting from movement of the spatter into the interior of the sealed battery's electrode assembly.

SUMMARY

An advantage of some aspects of the present invention is to provide a sealed battery which has exposed portions of positive electrode substrates at one end of a sealed-battery application electrode assembly and of negative electrode substrates at the other end, and which is high-reliability with low occurrence of internal short-circuits, since movement of spatter into the interior of the electrode assembly when collectors are resistance-welded to the substrates is prevented; together with a method for manufacturing such battery.

According to an aspect of the invention, a sealed battery includes a sealed-battery application electrode assembly having positive electrode substrates exposed at one end and negative electrode substrates exposed at the other end, and collectors that are resistance-welded on both sides of the positive or the negative electrode substrates or both, with insulating seal material being disposed around the resistance welds, between the substrates and collectors.

A sealed battery of an aspect of the invention must have a sealed-battery application electrode assembly having multiple positive electrode substrates exposed at one end and negative electrode substrates exposed at the other, and collector(s) and collector-receiving part(s) that are resistance-welded on both sides of the multiple positive electrode substrates or negative electrode substrates or both. Usually with such a sealed battery, large amounts of welding energy have to be applied in order to effect firm welding since the electrode assembly has a large number of stacked layers. Further, during resistance welding, occurrence of spatter increases. But with the sealed battery of this arrangement, insulating seal material is disposed around the resistance welds, between the substrates on the one hand and the collectors and collector-receiving parts on the other, thanks to which the spatter generated during resistance welding is captured in the insulating seal material around the resistance welds, and therefore does not splash out to the exterior. Hence, with the above arrangement, a high-reliability sealed battery is obtained in which there is low incidence of internal short-circuits. Also, even if the insulating seal material is disposed around the resistance welds between the substrates on the one hand and either the collectors alone, or the collector-receiving parts alone on the other, the insulating seal material around the resistance welds will still capture the spatter generated during resistance welding, yielding the effect that spatter splashing into the interior or out to the exterior of the electrode assembly is reduced to a low level.

According to the above arrangement, the substrates and collectors in such sealed battery may both be constituted of the same metal or may each be constituted of differing metals, and this applies equally well to the positive electrode substrates and to the negative electrode substrates. Further, provided that the sealed battery of this arrangement is equipped with a sealed battery application electrode assembly having positive electrode substrates exposed at one end and negative electrode substrates exposed at the other, and with collectors and collector receiving parts that are disposed opposing each other and resistance-welded on both sides of either the positive or the negative electrode substrates or both, the electrode assembly may be of the wound type or the stacked type, and moreover the battery may be a nonaqueous or aqueous electrolyte secondary battery.

Further, according to the above arrangement, in such sealed battery, the insulating seal material will preferably be tape constituted of thermodeposited resin, or adhesive insulating tape.

With the sealed battery of such mode, the high-temperature spatter that occurs during resistance welding will be deprived of its heat by partially melting the tape constituted of solid thermodeposited resin or the adhesive insulating tape, being thereby rapidly cooled so that its temperature falls, and therefore will readily be captured in the tape constituted of solid thermodeposited resin or the adhesive insulating tape. During resistance welding, current is passed for only a brief time, and moreover, flows over a narrow extent, so that the tape constituted of the thermodeposited resin or the adhesive insulating tape is rarely all melted at the same time. Therefore, the spatter that occurs during resistance welding will rarely splash from the tape constituted of the thermodeposited resin or the adhesive insulating tape and enter inside the electrode assembly. This means that a high-reliability sealed battery is obtained in which fewer internal short-circuits occur. The thermodeposited resin will preferably have deposition temperature on the order of 70 to 150° C. and melting temperature of 200° C. or over, and furthermore will preferably have chemical resistance with regard to the electrolyte, etc.

Also, in such sealed battery, on a resistance-welding portion of the collector or the collector-receiving part, or of both, there will be provided a protuberance that projects toward the other of such two items.

The protuberance—generally termed a "projection"—will preferably have a tip portion whose cross-sectional area is smaller than that of the base portion. Since current will concentrate in the tip portion of the protuberance during resistance welding, the reactive current not used in resistance welding is reduced, and resistance welding can be carried out effectively and robustly even if the electrical resistance of the substrates, collectors and collector receiving parts is low and their thermal conductivity is high. Hence, with such aspects, a sealed battery is obtained in which the weld reliability is higher and which at the same time yields the foregoing advantages of the above arrangement.

Also, in such sealed battery, a protuberance such as aforementioned that projects toward the other of the two items will preferably be provided on a resistance-welding portion of the collector or of the collector-receiving part, and on the other of such two items—the collector or the collector-receiving part as the case may be—there will preferably be formed a flat-surfaced salient at a portion that is opposed to the protuberance.

During resistance welding, the collectors and collector receiving parts are pushed together from both sides by the bolt poles as resistance welding is performed, and because of this, the thermodeposited resin itself, or the adhesive, of the insulating seal material disposed around the welds may protrude out to the weld. If resistance welding is performed in such a state with the thermodeposited resin itself, or the adhesive, protruding out to the weld, then the thermodeposited resin itself, or the adhesive, may explosively combust. However, when a flat-surfaced salient is formed on the other of the two items—on the collector or collector-receiving part as the case may be—at the portion that is opposed to the protuberance, then even if the thermodeposited resin, or the adhesive, protrudes out during resistance welding, the protruding thermodeposited resin or adhesive will not reach the surface of the protuberances or the flat-surfaced salient, and therefore a sealed battery will be obtained that is safe and that has efficient and robust resistance welds.

Also, in such sealed battery, the shape of the flat-surfaced salient will preferably be circular viewed from above, and will preferably have a diameter larger than that of the protuberance.

With the sealed battery of such mode, it will be possible to maintain the flat-surfaced salient and the tip portion of the protuberance in the opposed state in which they were disposed, even if the collector and collector receiving part are mispositioned when disposed; thanks to which, a sealed battery is obtained in which the weld reliability is higher and which at the same time yields the foregoing advantages of the above arrangement.

Also, in such sealed battery, the resistance-welded substrates, collector and collector-receiving part may all be constituted of copper or copper alloy.

Copper and copper alloy are the items with the lowest electrical resistance and the highest thermal conductivity among the commonly-used conductive metals, and therefore generate large amounts of spatter during resistance welding, which requires large current to be passed. But with the sealed battery of the above arrangement, these large amounts of spatter that are generated will be captured in the insulating seal material around the resistance welds, so that the foregoing advantages of the above arrangement will work to satisfactory effect.

According to another aspect of the invention, a method for manufacturing the sealed battery includes processes (1) to (3) below.

(1) A process whereby there is formed a sealed battery application electrode assembly having exposed portions of multiple positive electrode substrates at one end and of multiple negative electrode substrates at the other end, (2) a process whereby a collector and a collector-receiving part are brought against both surfaces of the place to be welded on the exposed portions of the positive or the negative electrode substrates, or of both, with insulating seal material having an opening in the center being interposed, and (3) a process whereby resistance welding is effected by passing current between the collector and collector-receiving part positioned on either side.

With such manufacturing method for the sealed battery of the above arrangement, during resistance welding the current is passed via the opening provided in the center of the insulating seal material. Therefore, during resistance welding the current concentrates in the opening portion provided in the insulative tape, so that the reactive power not contributing to the welding is reduced and reactive welding can be performed efficiently and robustly. Moreover, because the surroundings of the resistance weld are enclosed by insulative tape, the spatter that is generated during resistance welding is captured in such insulating seal material around the resistance weld and therefore does not splash to the exterior. Thus, with the manufacturing method for the sealed battery of this arrangement, a sealed battery will be obtained in which few internal short circuits occur and which therefore is high-reliability.

Further, in the manufacturing method for the sealed battery of the above arrangement, the insulating seal material will preferably be tape constituted of thermodeposited resin, or adhesive insulating tape.

With such mode of the manufacturing method for the sealed battery, it will be easy to dispose the insulating seal material in particular positions around the resistance welds. In addition, the high-temperature spatter that occurs during resistance welding will be deprived of its heat by partially melting the tape constituted of solid thermodeposited resin, or the insulating tape, being thereby rapidly cooled so that its temperature falls, and therefore will readily be captured in the tape constituted of solid thermodeposited resin or the insulating tape. During resistance welding, current is passed for a brief time and moreover flows over a narrow extent, so that the tape constituted of solid thermodeposited resin, or the insulating tape, is rarely all melted at the same time. Therefore, the spatter that occurs during resistance welding will rarely splash from the solid thermodeposited resin or insulating tape and enter inside the electrode assembly. This means that a high-reliability sealed battery is obtained in which occurrences of internal short-circuits are fewer.

The thermodeposited resin will preferably have deposition temperature on the order of 70 to 150° C. and melting temperature of 200° C. or over, and furthermore will preferably have chemical resistance with regard to the electrolyte, etc. For the thermodeposited resin, a rubber-based seal material, acid-modified polypropylene, polyolefin-based thermodeposited resin or the like can be used. Further, for the adhesive insulating tape, polyimide tape, polypropylene tape, polyphenylene sulfide tape or the like can be used, or it could be an item of multilayered structure with insulative thermodeposited resin layers.

Also, in process (2) of such manufacturing method for the sealed battery of the above arrangement, on the resistance-welding portion of either the collector or the collector-receiving part, or of both, there will preferably be formed a protuberance that projects toward the other of such two items, and that will be brought into contact with the welding portion of the substrates in such a manner as to be positioned at the opening at the center of the insulating seal material.

This protuberance—generally termed a "projection"—will preferably have a tip portion whose cross-sectional area is smaller than that of the base portion. Since current will concentrate in the tip portion of the protuberance during resistance welding, the reactive current that is not used in resistance welding will be reduced, and efficient and robust resistance welding can be carried out even if the electrical resistance of the substrates, collectors and collector receiving parts is low and their thermal conductivity is high. In addition, since the protuberance is disposed so as to be positioned at the opening in the center of the insulating seal material, protruding of the insulating seal material toward the weld due to the insulating material being mispositioned prior to resistance welding can be prevented, and thereby, explosive combustion of insulating seal material protruding toward the weld during resistance welding can be eliminated. Hence, with such mode of the manufacturing method for the sealed battery, a sealed battery can be manufactured in which the weld reliability is high.

Also, with such manufacturing method for the sealed battery of the above arrangement, the thickness of the insulating seal material will preferably be 0.1 to 1.0 times the height of the protuberance. More preferably, the thickness of the insulating seal material will be ⅔ to 1.0 times the height of the protuberance.

If the thickness of the insulating seal material were less than 0.1 times the height of the protuberances, the situation would be essentially the same as that where there is no insulating seal material and would be undesirable since splashing of the spatter to the exterior could not be inhibited and as a result internal short-circuits would increase. When the thickness of the insulating seal material is ⅔ or more times the height of the protuberances, the spatter capture effect will be satisfactory. Also, if the thickness of the insulating seal material exceeded 1.0 times the height of the protuberance, excessive pressure would be required because the protuberance would be brought directly into contact with the substrates. Therefore such thickness would not be desirable.

Also, with such manufacturing method for the sealed battery of the above arrangement, the width of the opening in the center of the insulating seal material will preferably be 1 to 5 times the width of the protuberance.

If the width of the opening in the center of the insulating seal material were less than 1.0 times the width of the protuberance, the insulating seal material would partially cover the tip portion of the protuberance, and consequently insulating seal material residue would be liable to be left around the weld during resistance welding, which could result in explosive combustion and/or lowering of the weld strength and reliability. Such width is therefore undesirable. Also, if the width of the opening in the center of the insulating seal material exceeded 5 times the width of the protuberances, the situation would be essentially the same as that where there is no insulating tape and would be undesirable since splashing of the spatter to the exterior could not be inhibited and as a result internal short-circuits would increase. Note that the width of the opening in the center of the insulating tape, and/or the width of the protuberance, refers to the diameter in the case where these items are circular in shape and to the longest diagonal width in the case where they are of a rectangular shape.

Alternatively, in process (2) of such manufacturing method for the sealed battery of the above arrangement, on the resistance-welding portion of the collector or of the collector-receiving part there will preferably be provided a protuberance that projects toward the other of such two items, and on the other of such two items—on the collector or the collector-receiving part as the case may be—there will be formed a flat-surfaced salient at a portion that is opposed to the protuberance, and the protuberance and the flat-surfaced salient will be brought against the welding portion of the substrates in such a manner as to be positioned opposing each other at the openings in the centers of the insulating seal material.

With such mode of the manufacturing method for the sealed battery, even if the insulating seal material's thermodeposited resin, or adhesive, protrudes out during resistance welding, such resin or adhesive will not reach the surface of the protuberance or the flat-surfaced salient, and moreover the current during resistance welding will flow concentrated at the tip of the protuberance and at part of the surface of the flat-surfaced salient, so that the thermodeposited resin, or adhesive, will not explosively combust. Furthermore, since the flat-surfaced salient will serve to position the insulating seal material, protrusion of the insulative seal material toward the weld because of the insulating material being mispositioned prior to resistance welding can readily be prevented, and thereby, explosive combustion of insulating seal material protruding out toward the weld during resistance welding can be eliminated. Hence, with such mode of the manufacturing method for the sealed battery, resistance welding can be performed safely and robustly and moreover productivity can be greatly improved so that a sealed battery with high weld reliability can be efficiently manufactured.

Also, in such manufacturing method for the sealed battery of the above arrangement, the shape of the flat-surfaced salient will preferably be circular viewed from above and will preferably have a diameter larger than that of the protuberance.

With such mode of the manufacturing method for the sealed battery, formation of the flat-surfaced salient will be easy, and moreover it will be simple to maintain the flat-surfaced salient and the tip of the protuberance in the opposed state in which they were disposed, even if the collector and collector receiving part are mispositioned when disposed; thanks to which, a sealed battery is obtained in which the weld reliability is higher and which at the same time yields the foregoing advantages of the above arrangement.

Also, with such manufacturing method for the sealed battery of the above arrangement, the thickness of the insulating seal material will preferably be 0.1 to 1.0 times the height of the protuberance. More preferably, the thickness of the insulating seal material will be ⅔ to 1.0 times the height of the protuberance.

If the thickness of the insulating seal material were less than 0.1 times the height of the protuberances, the situation would be essentially the same as that where there is no insulating seal material and would be undesirable since splashing of the spatter to the exterior could not be inhibited and as a result internal short-circuits would increase. When the thickness of the insulating tape is ⅔ or more times the height of the protuberance, the spatter capture effect will be satisfactory. Also, if the thickness of the insulating seal material exceeded 1.0 times the height of the protuberance, excessive pressure would be required because the protuberances would be brought directly into contact with the substrates. Therefore such thickness is not desirable.

Also, with such manufacturing method for the sealed battery of the above arrangement, the width of the opening in the center of the insulating seal material will preferably be 1 to 5 times the width of the protuberance.

If the width of the opening in the center of the insulating seal material were less than 1.0 times the width of the protuberance, the insulating seal material would partially cover the tip portion of the protuberance and therefore insulating seal material residue would be liable to be left around the weld during resistance welding, which could result in explosive combustion and/or lowering of the weld strength and reliability. Such width is therefore undesirable. Also, if the width of the opening in the center of the insulating seal material exceeded 5 times the width of the protuberance, the situation would be essentially the same as that where there is no insulating tape and would be undesirable since splashing of the spatter to the exterior could not be inhibited and as a result internal short-circuits would increase.

Also, with such manufacturing method for the sealed battery of the above arrangement, the insulating seal material will preferably be tape constituted of thermodeposited resin, and, designating as L the thickness of such tape constituted of thermodeposited resin and as H the height of the flat-surfaced salient, L and H will preferably be in the range such that $L<H<(3/2)L$.

When the insulating seal material consists of tape constituted of thermodeposited resin, then since the resistance welding bolt poles will become hot, especially if resistance welding is performed continuously, the thermodeposited resin could soften before the resistance welding current is applied, and protrude out to the welds. If this happens, then because—provided that $L<H$—the surface of the flat-surfaced salient will project out further than the thermodeposited resin tape, the softened thermodeposited resin tape will not protrude out as far as the surface of the flat-surfaced salient. Also, provided that $H<(3/2)L$, the thermodeposited resin tape's effect of capturing the spatter generated during resistance welding will be satisfactory. Thus, provided that the thickness of the tape constituted of thermodeposited resin and the height of the flat-surfaced salient satisfy the above conditions, the thermodeposited resin will not, even if it protrudes out during resistance welding, reach as far as the surface of the flat-surfaced salient. Therefore, the adhesive thereof will not explosively combust, and a sealed battery can be manufactured that is safe and moreover has high weld reliability.

Alternatively, with such manufacturing method for the sealed battery of the above arrangement, the insulating seal material may be adhesive insulating tape, and, designating as t the total thickness of such adhesive insulating tape, as a the thickness of its adhesive, and as H the height of the flat-surfaced salient, t and a will preferably be in the range such that $a<H<(3/2)t$.

Since the adhesive will be soft and therefore prone to change its shape, it will be liable to protrude out from the insulating tape when pressure is applied with the bolt poles during resistance welding. However, with a and H in the relation $a<H$, the adhesive's thickness a will be lower than the height H of the flat-surfaced salient and therefore the adhesive will not cover the flat-surfaced salient during resistance welding. Also, with $H<(3/2)t$, the effectiveness of capture of the spatter generated during resistance welding will be satisfactory. Thus, provided that the total thickness of the adhesive insulating tape, the thickness of its adhesive, and the height of the flat-surfaced salient satisfy the above conditions, a sealed battery can be manufactured that is safe and moreover has high resistance weld reliability.

BRIEF DESCRIPTION OF THE DRAWINGS

The invention will be described with reference to the accompanying drawings, in which the same numerals refer to the same elements throughout.

DESCRIPTION OF EXEMPLARY EMBODIMENTS

Exemplary embodiments of the invention will now be described with reference to the accompanying drawings and to working examples and a comparative example. It should be understood however that the embodiments below are intended by way of illustrative examples of methods for manufacturing a prismatic nonaqueous electrolyte secondary battery, as an instance of a sealed battery, that carry out the technical concepts of the invention, and are not intended by way of limiting the invention to these particular manufacturing methods for a prismatic nonaqueous electrolyte secondary battery. The invention could equally well be applied to yield other embodiments within the scope and spirit of the claims.

Figures 1A, 1B:
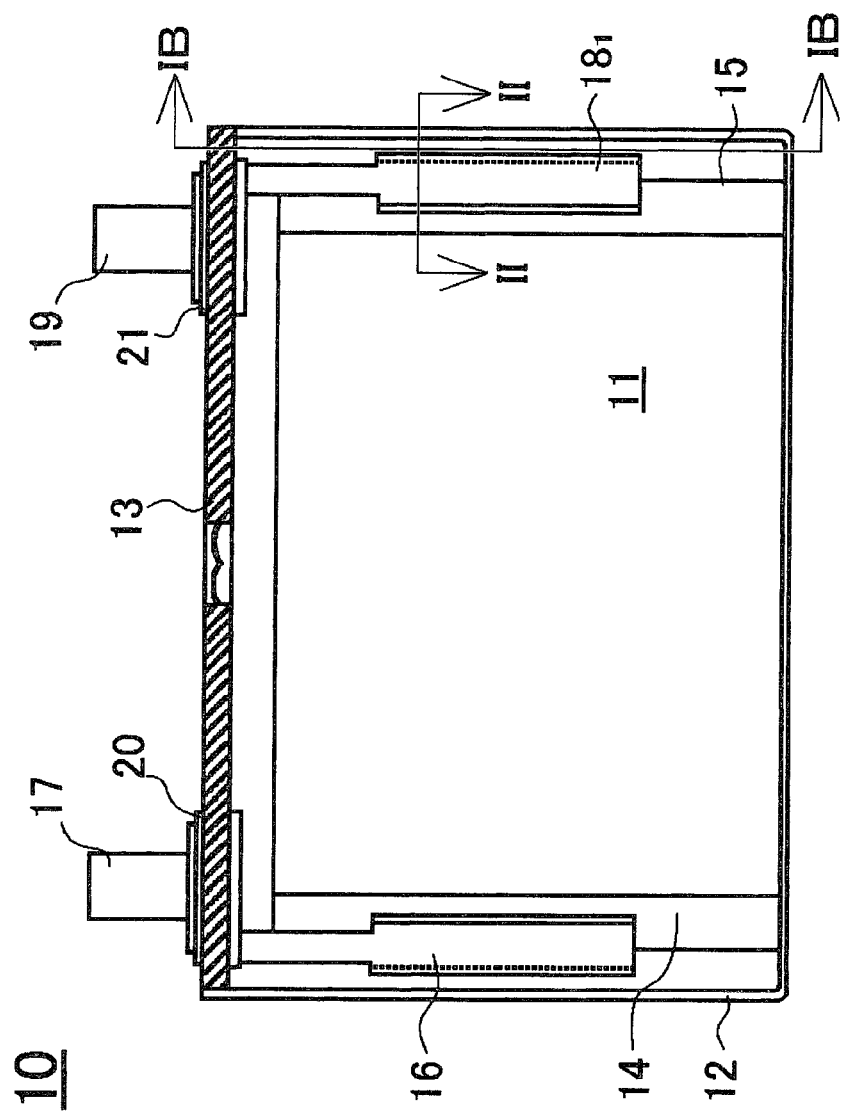
FIG. 1A is a front view illustrating the internal structure of a prismatic battery, as an instance of a sealed battery, that is common to the working examples and the comparative example.
FIG. 1B is a cross-sectional view along line IB-IB in FIG. 1A.
Figure 2:
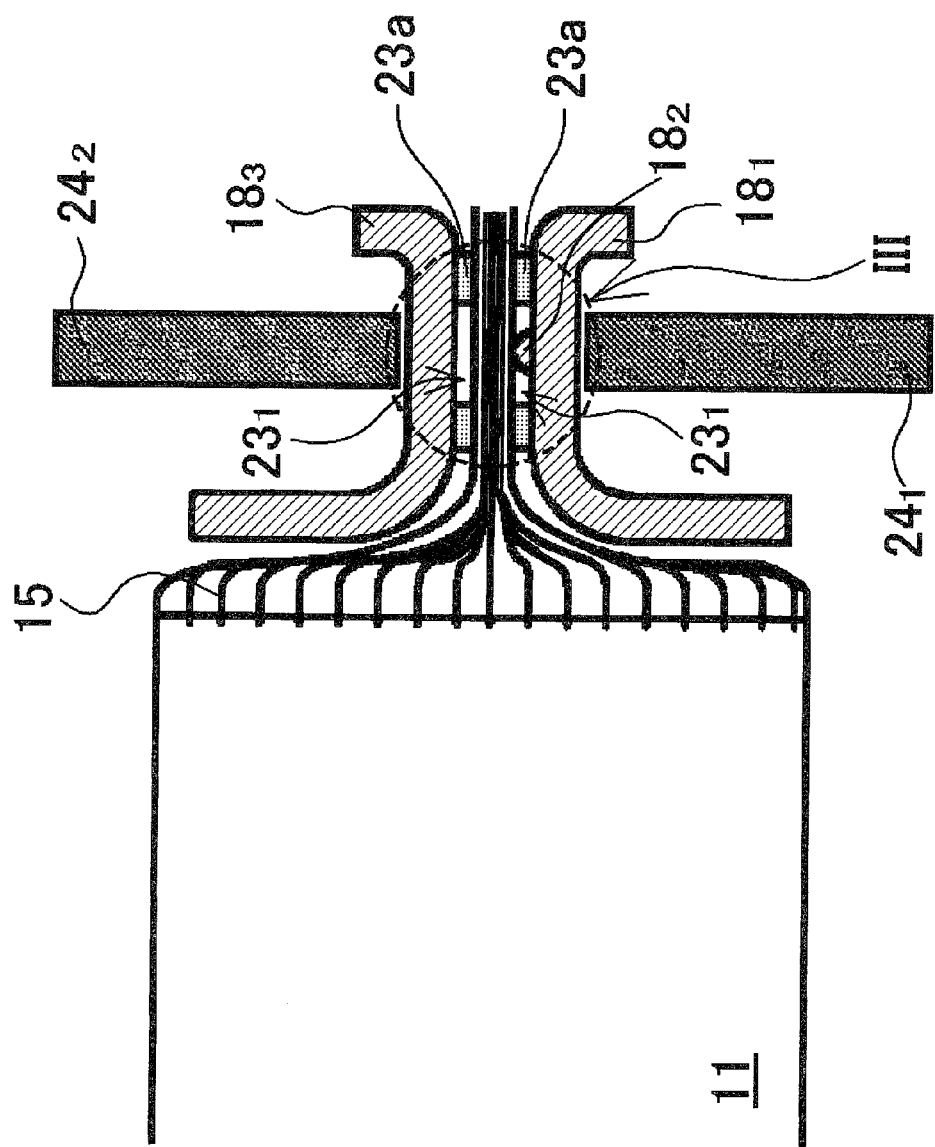
FIG. 2 is an enlarged cross-sectional view, along line II-II, of the first working example prismatic battery in FIG. 1A.
Figure 3:
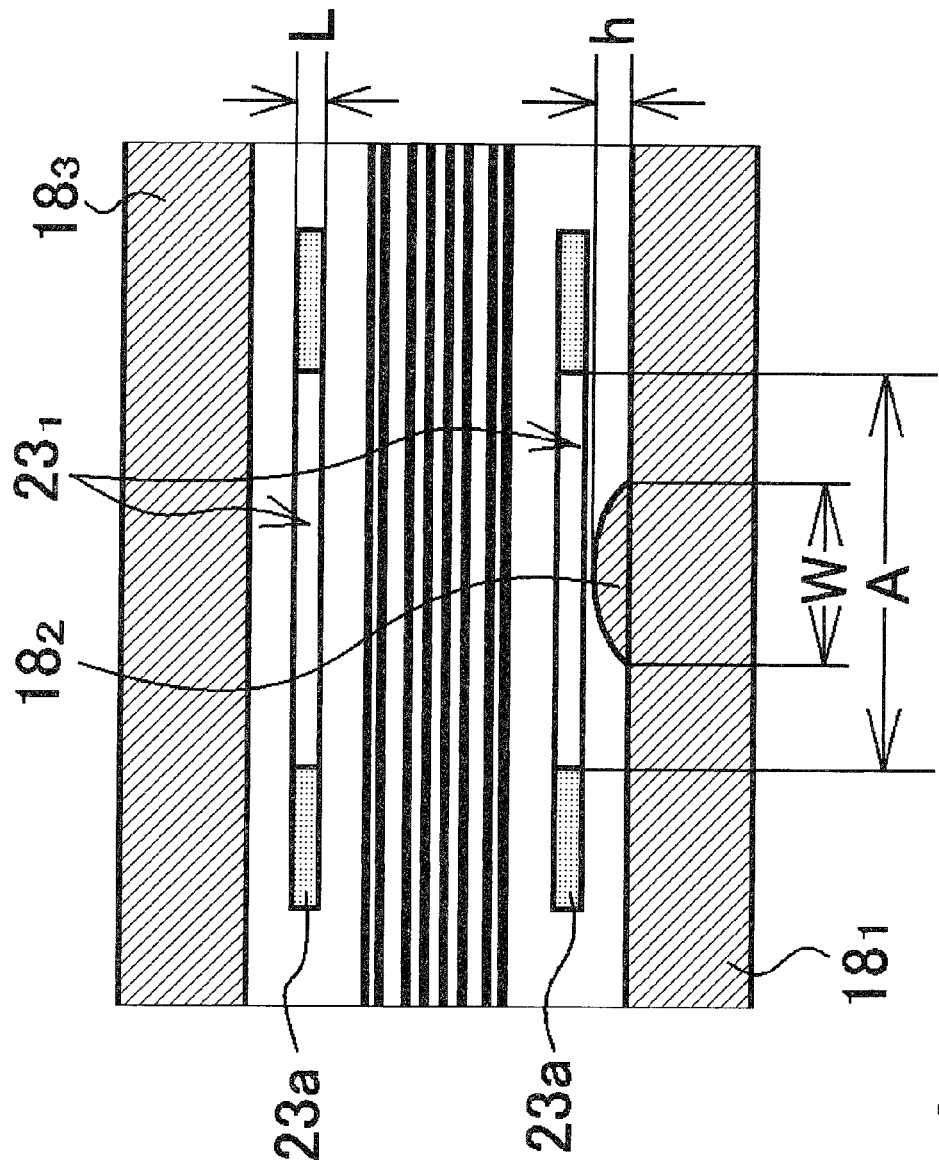
FIG. 3 is an enlarged exploded cross-sectional view of portion III in FIG. 2.
Figure 4:
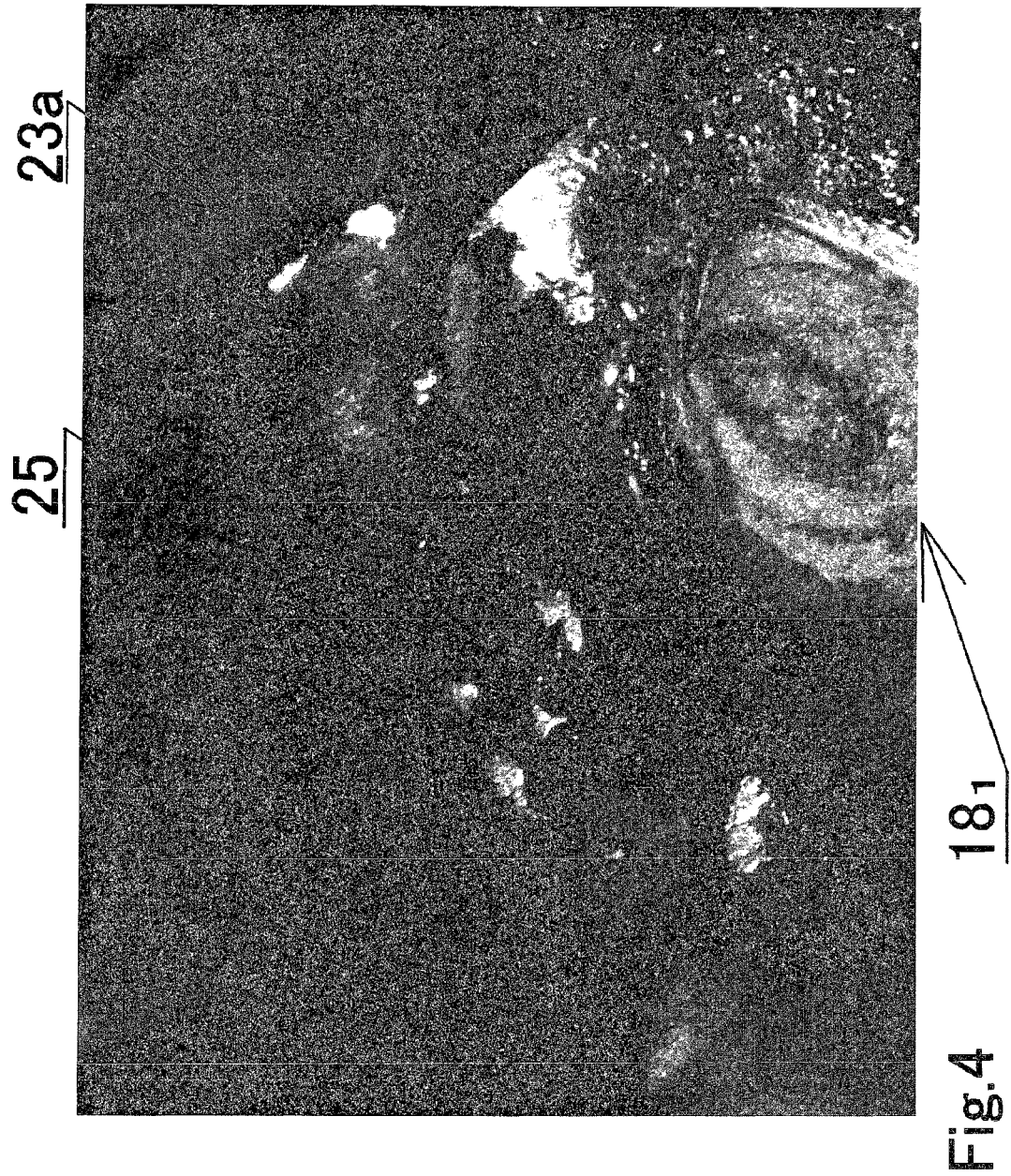
FIG. 4 is an enlarged photograph of the peeled surface of a resistance weld in the first working example.
Figure 5:
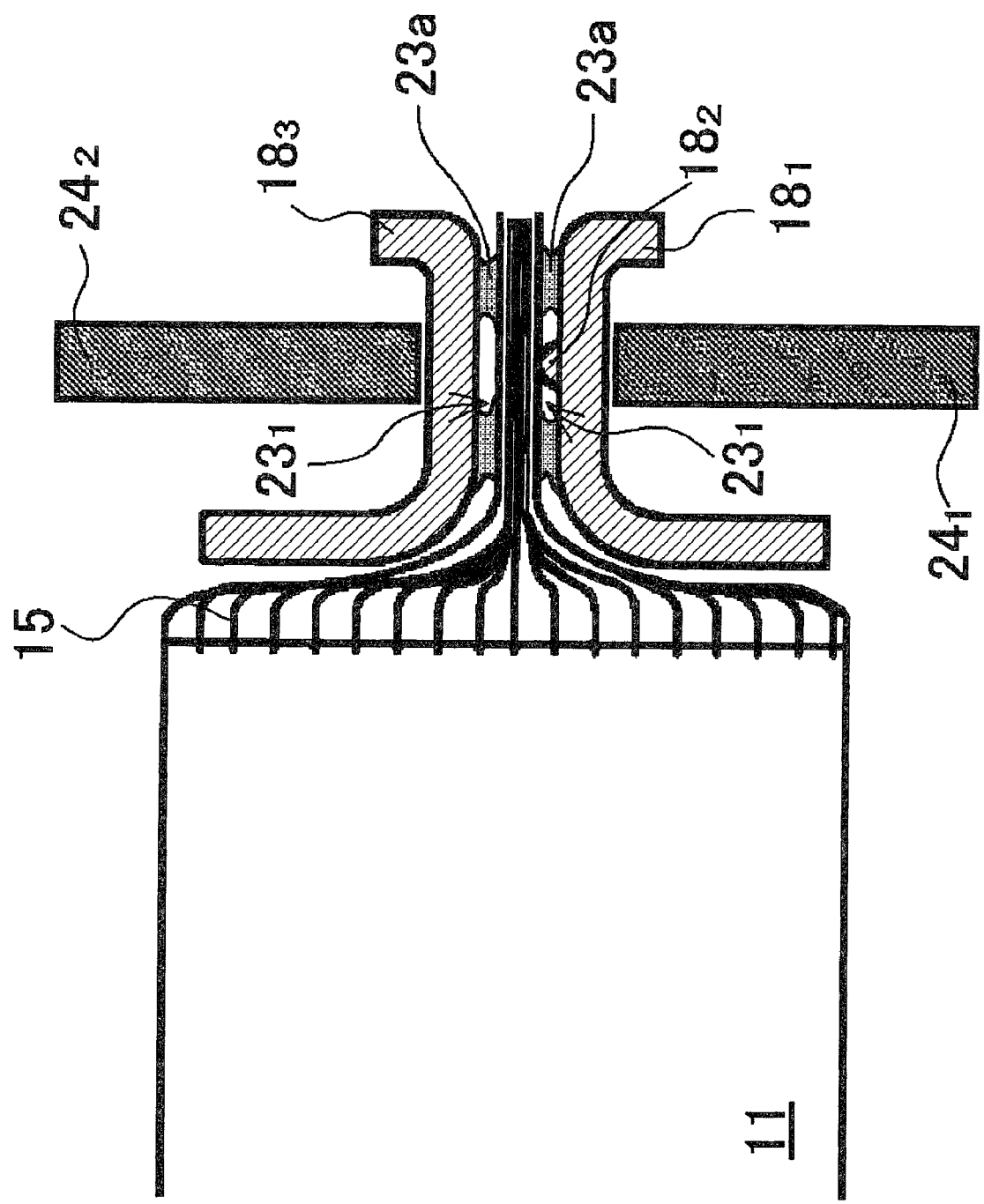
FIG. 5 is an enlarged cross-sectional view, corresponding to FIG. 2, illustrating the state where tape constituted of thermodeposited resin and serving as the insulating seal material has softened.
Figure 6:
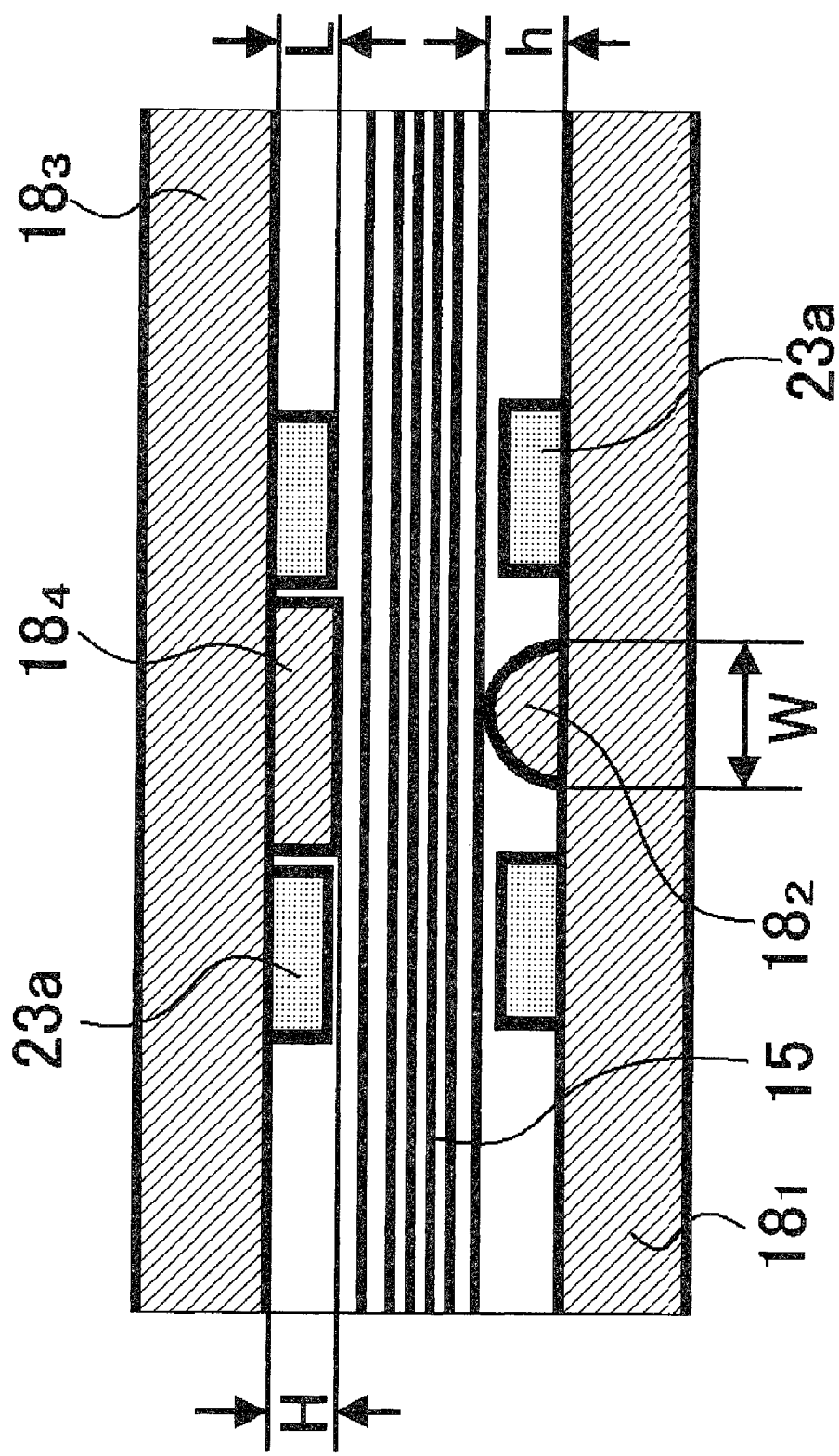
FIG. 6 is an enlarged cross-sectional view, corresponding to FIG. 3, of the prismatic battery in a second working example.
Figure 7:
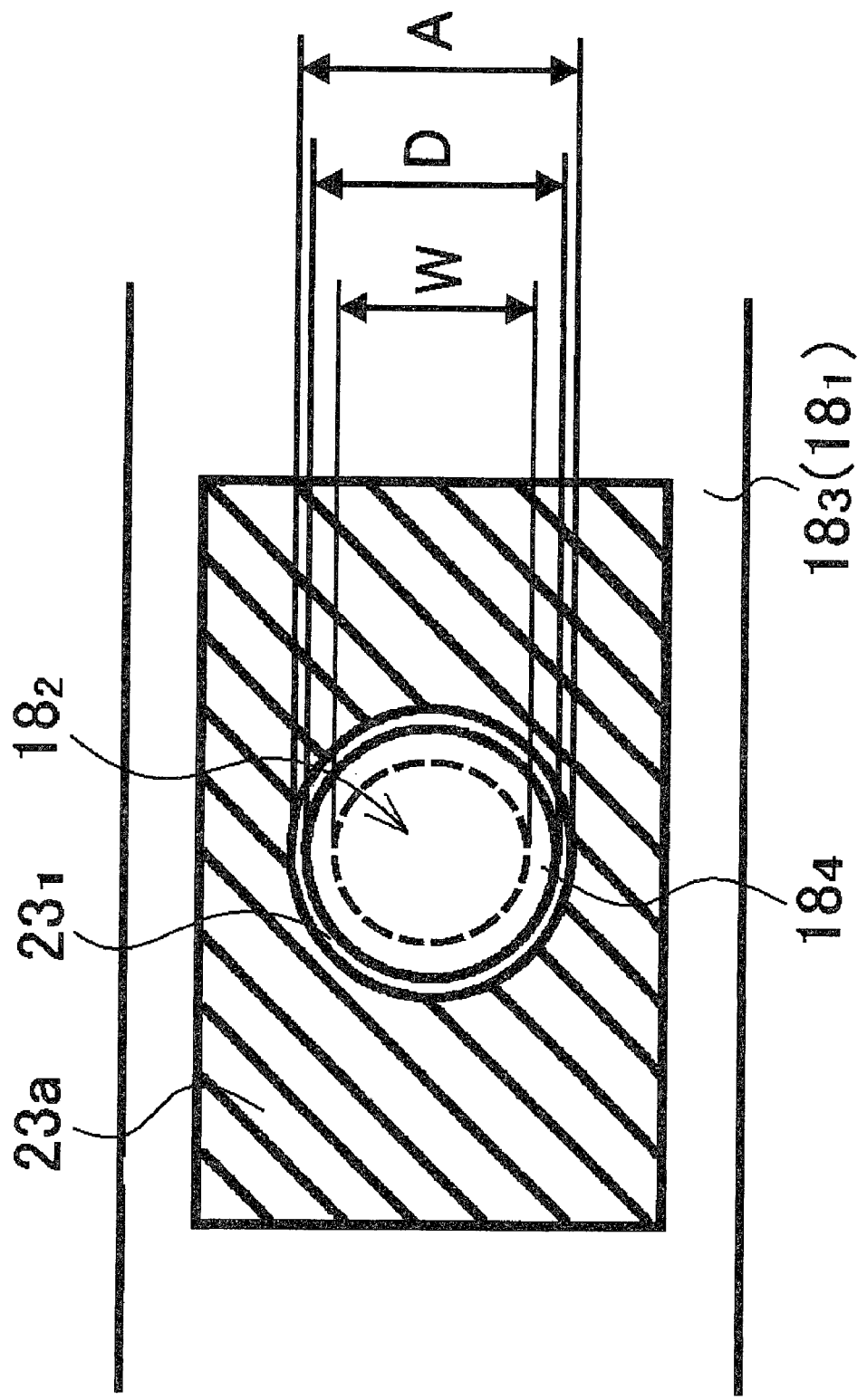
FIG. 7 is a drawing illustrating, in a planar perspective, the layout relationship of the insulating seal material, flat-surfaced salient and protuberance.
Figure 8:
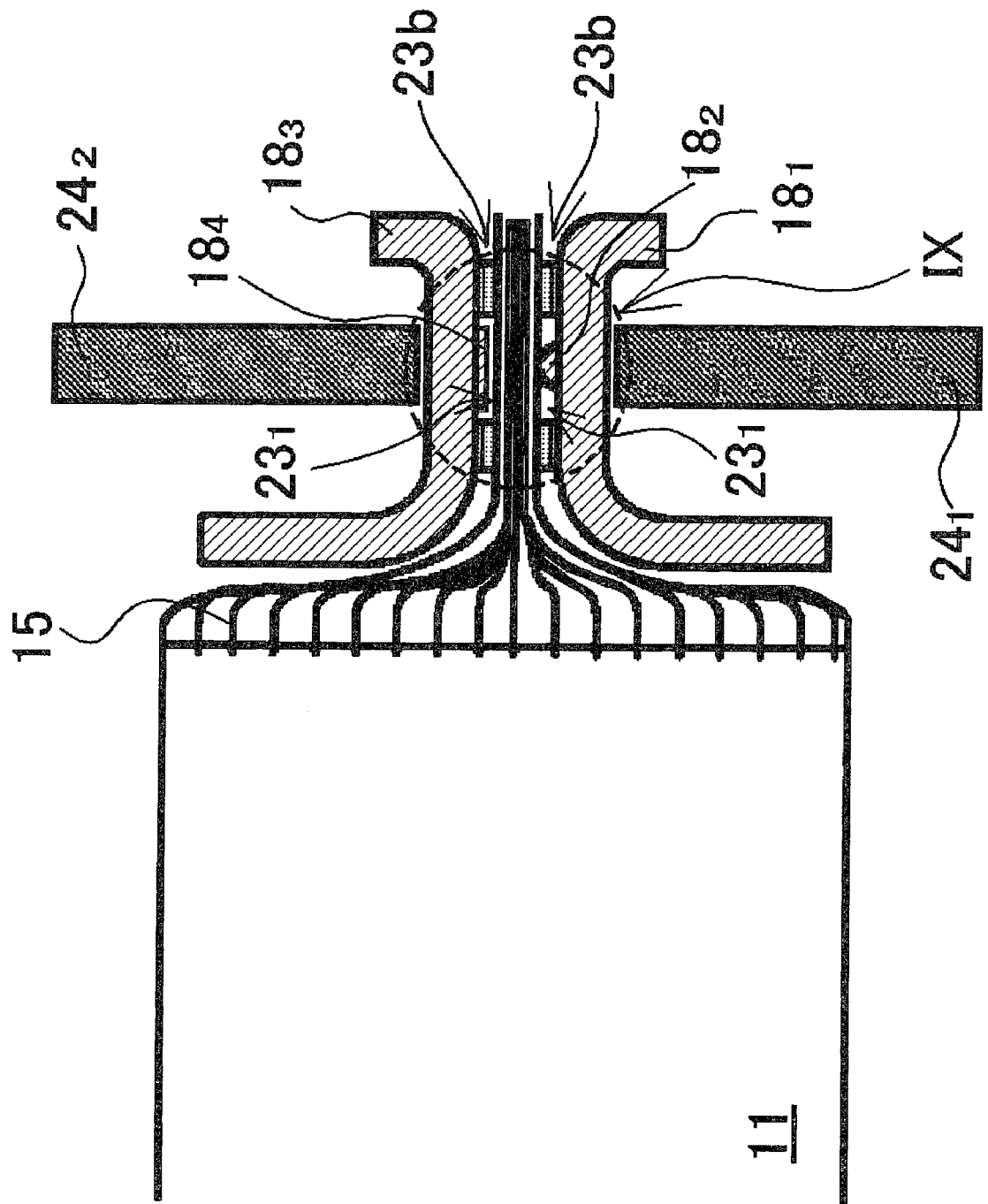
FIG. 8 is an enlarged cross-sectional view, corresponding to FIG. 2, of the prismatic battery in a third working example.
Figure 9:
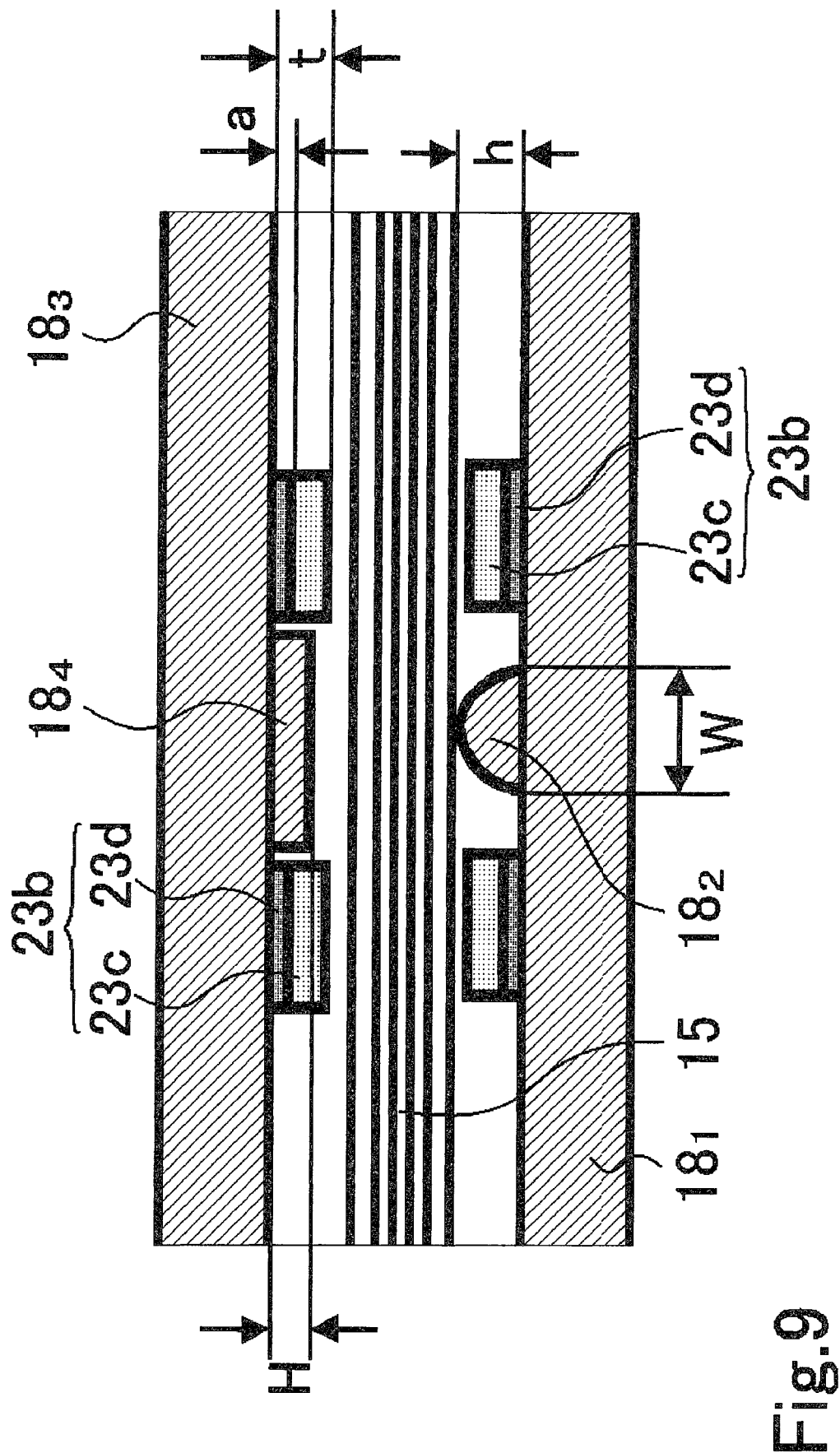
FIG. 9 is an enlarged cross-sectional view of portion IX in FIG. 8.
Figure 10:
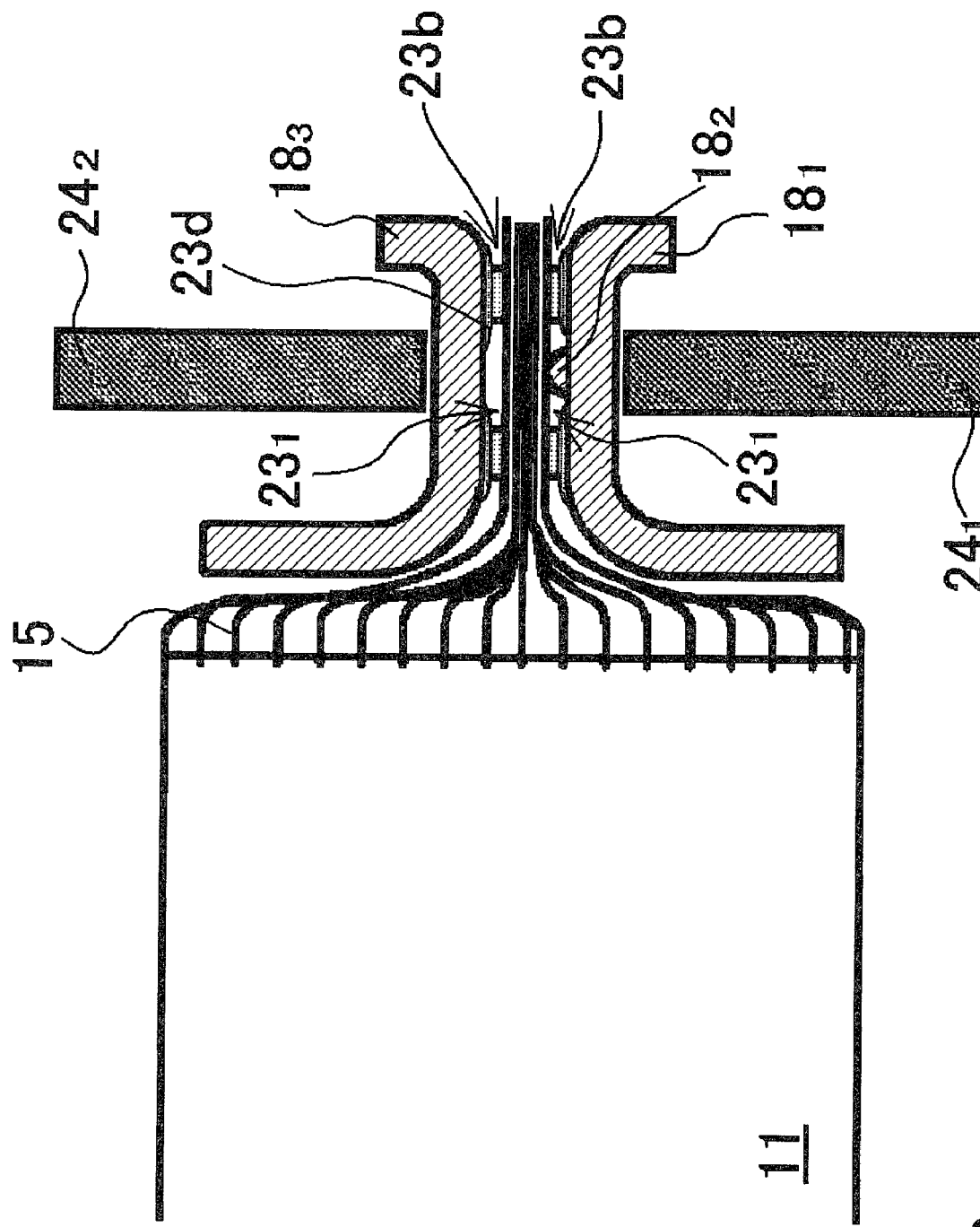
FIG. 10 is an enlarged cross-sectional view, corresponding to FIG. 2, of a variant of the third working example.

FIG. 1A is a front view illustrating the internal structure of a prismatic battery, as an instance of a sealed battery, that is common to the working examples and the comparative example, and FIG. 1B is a cross-sectional view along line IB-IB in FIG. 1A. FIG. 2 is an enlarged cross-sectional view, along line II-II, of the first working example prismatic battery in FIG. 1A. FIG. 3 is an enlarged exploded cross-sectional view of portion III in FIG. 2. FIG. 4 is an enlarged photograph of the peeled surface of a resistance weld in the first working example. FIG. 5 is an enlarged cross-sectional view, corresponding to FIG. 2, illustrating the state where tape constituted of thermodeposited resin and serving as the insulating seal material has softened. FIG. 6 is an enlarged cross-sectional view, corresponding to FIG. 3, of the prismatic battery in a second working example. FIG. 7 is a drawing illustrating, in a planar perspective, the layout relationship of the insulating seal material, flat-surfaced salient and protuberance. FIG. 8 is an enlarged cross-sectional view, corresponding to FIG. 2, of the prismatic battery in a third working example. FIG. 9 is an enlarged cross-sectional view of portion IX in FIG. 8. FIG. 10 is an enlarged cross-sectional view, corresponding to FIG. 2, of a variant of the third working example.

First of all a prismatic nonaqueous electrolyte secondary battery that is as an instance of a sealed battery and is common to both the working examples and the comparative example will be described using FIGS. 1A and 1B. In this prismatic nonaqueous electrolyte secondary battery 10, a flat wound electrode assembly 11, which is made up of positive electrode plates (not shown in the drawings) and negative electrode plates (not shown in the drawings) wound with separators (not shown in the drawings) interposed, is housed inside a rectangular outer can 12, and the outer can 12 is sealed by a sealing plate 13.

The flat wound electrode assembly 11 has, at one end in the winding axis direction, positive electrode substrate exposed portions 14 over which positive electrode binder is not spread, and at the other end, negative electrode substrate exposed portions 15 over which negative electrode binder is not spread. The positive electrode substrate exposed portions 14 are connected to a positive electrode terminal 17 via a positive electrode collector 16 and the negative electrode substrate exposed portions 15 are connected to a negative electrode terminal 19 via a negative electrode collector $18_1$. The positive electrode terminal 17 and the negative electrode terminal 19 are fixed to the sealing plate 13 via insulating members 20 and 21 respectively.

To fabricate this prismatic nonaqueous electrolyte secondary battery, the flat wound electrode assembly 11 is inserted into the outer can 12, then the sealing plate 13 is laser-welded over the mouth portion of the outer can 12, after which the nonaqueous electrolyte is poured in through an electrolyte pour hole (not shown in the drawings) and the electrolyte pour hole is sealed up. As the electrolyte, use could be made of, say, a solution of ethylene carbonate and diethyl carbonate mixed in the proportion 3:7 by volume, into which 1 mole/L of $LiPF_6$ is dissolved to produce a nonaqueous electrolyte.

Next is described the specific manufacturing method for the flat wound electrode assembly 11, which is common to both the working examples and the comparative example.

Fabrication of Positive Electrode Plates

The positive electrode plates are fabricated as follows. First of all, lithium cobalt oxide ($LiCoO_2$) powder serving as the positive electrode active material, carbon-based powder such as acetylene black or graphite serving as the conducting material, and binding agent constituted of polyvinylidene-fluoride (PVDF) are mixed in the proportions 94%, 3% and 3% by mass. Then an organic solvent constituted of N-methyl-2-propylene (NMP) is added to the resulting mixture and stirred in to form a positive electrode active material slurry. Next, a positive electrode substrate constituted of aluminum foil (say 20 "m thick) is prepared, and the positive electrode active material slurry made in the foregoing manner is applied evenly over both surfaces of the positive electrode substrate to form positive electrode active material mixture layers. The positive electrode active material is applied in such a manner that in the positive electrode active material mixture layer on one surface, a bare portion (positive electrode substrate exposed portion) of a particular width (12 mm in this example) where the slurry is not applied is formed along the edge of the positive electrode substrate. After that, the positive electrode substrate with the positive electrode active material mixture layers formed thereon is passed through a drier, where the NMP that was needed during fabrication of the slurry is removed and the substrate is dried. After such drying, the substrate is rolled in a roll press into a positive electrode plate of thickness 0.06 mm. The positive electrode plate thus fabricated is then cut into a strip 100 mm wide, so that a positive electrode plate is obtained that is provided with a 10 mm wide strip-form exposed portion of aluminum positive electrode substrate.

Fabrication of Negative Electrode Plates

The negative electrode plates are fabricated as follows. First of all, natural graphite powder serving as the negative electrode active material, and carboxymethyl cellulose (CMC) and styrene-butadiene rubber (SBR) serving as binding agents, are mixed in the proportions 98%, 1% and 1% by mass. Then water is added and the mixture is stirred to produce a negative electrode active material slurry. Next, a negative electrode substrate constituted of copper foil (say 12 "m thick) is prepared, and the negative electrode active material slurry made in the foregoing manner is applied evenly over both surfaces of the negative electrode substrate to form negative electrode active material mixture layers. The negative electrode active material is applied in such a manner that in the negative electrode active material mixture layer on one surface, a bare portion (negative electrode substrate exposed portion) of a particular width (10 mm in this example) where the slurry is not applied is formed along the edge of the negative electrode substrate. After that, the negative electrode substrate with the negative electrode active material mixture layers formed thereon is passed through a drier and dried. After such drying, the substrate is rolled in a roll press into a negative electrode plate of thickness 0.05 mm. The negative electrode plate thus fabricated is then cut into a strip 110 mm wide, so that a negative electrode plate is obtained that is provided with an 8 mm wide strip-form exposed portion of negative electrode substrate.

Fabrication of Wound Electrode Assembly

First, the positive electrode substrate exposed portions of the positive electrode plates, and negative electrode substrate exposed portions of the negative electrode plates, that were obtained in the foregoing manner, are displaced so as not to overlie the electrode active material layers that are respectively opposed to them, and then the electrode plates are wound, with porous polyethylene separators (0.022 mm thick and 100 mm wide) interposed, to produce a flat wound electrode assembly 11 which has multiple positive electrode substrate exposed portions 14 constituted of aluminum foil formed at one end and negative electrode substrate exposed portions 15 constituted of copper foil at the other, and which is used in the working examples and the comparative example.

Resistance Welding of Collectors

A positive electrode collector 16 and a positive electrode collector receiving part (not shown in the drawings) made of aluminum are attached by resistance welding to the positive electrode substrate exposed portions 14 of the flat wound electrode assembly 11 fabricated in the foregoing manner, and likewise, a negative electrode collector $18_1$ and a negative electrode collector receiving part $18_3$ made of copper are attached by resistance welding to the negative electrode substrate exposed portions 15. Below, attachment of the negative electrode collector $18_1$ and negative electrode collector receiving part $18_3$ made of copper to the negative electrode substrate exposed portions 15 by resistance welding is described.

First Example

For the prismatic nonaqueous electrolyte secondary battery 10 of the first working example, an item was used in which a protuberance $18_2$ (height h=0.8 mm, base portion diameter W=2 mm) acting as a projection was formed on the central portion of the negative electrode collector $18_1$. For the insulating seal material, tape 23a (thickness L=0.1 mm) made of thermodeposited resin and with an opening $23_1$ (circular, diameter A=6 mm) in the central portion was used. The thermodeposited resin tape 23a used consisted of multilayer film including polyolefin-based thermodeposited resin layers.

First of all, the negative electrode substrate exposed portions 15, made of copper, were bunched together, and thermodeposited resin tapes 23a were placed above and below the resulting bunch in such a manner that the centers of the openings $23_1$ formed in the thermodeposited resin tapes 23a coincided, the bunch was disposed so that the protuberance $18_2$ on the copper negative electrode collector $18_1$ was aligned from below with the center of the opening $23_1$ in the lower thermodeposited resin tape 23a, and likewise the negative electrode collector receiving part $18_3$ was disposed so as to block up the opening $23_1$ in the lower thermodeposited resin tape 23a. Next, the copper pole bolts $24_1$ and $24_2$ of the welding unit (not shown in the drawings) were moved in from above and below so as to contact and pinch together the negative electrode collector $18_1$ and negative electrode collector receiving part $18_3$. Then the two pole bolts $24_1$ and $24_2$ were pushed toward each other so as to be in a slightly short-circuited state, and resistance welding was effected by passing briefly between the two pole bolts $24_1$ and $24_2$ an optimal welding current (say 4 kA) determined experimentally in advance.

The peeling strength of the copper negative electrode collector $18_1$ and negative electrode collector receiving part $18_3$, as measured with a tensile tester, was 19.6 N (20 kgf). An enlarged photograph of the peeled surface is shown in FIG. 4. As is evident from FIG. 4, copper spatter 25 generated by the resistance welding was captured into the thermodeposited resin tape 23a.

The tape to serve as the thermodeposited resin tape 23a can be selected and used as appropriate, provided that the deposition temperature of the thermodeposited resin is on the order of 70 to 150° C. and its solution temperature is 200° C. or over. As a further requirement however, such tape will preferably have chemical resistance with regard to the nonaqueous electrolyte, etc. A rubber-based seal material, acid-modified polypropylene, polyolefin-based thermodeposited resin or the like can be used as the thermodeposited resin.

Also, the thickness L of the thermodeposited resin tape 23a will preferably be 0.1 to 1.0 times the height h of the protuberance $18_2$. If the thickness L of the thermodeposited resin tape 23a were less than 0.1 times the height h of the protuberance $18_2$, the situation would be essentially the same as that where there is no thermodeposited resin tape 23a and would be undesirable since splashing of the spatter to the exterior could not be inhibited and as a result internal short-circuits would increase. Also, if the thickness L of the thermodeposited resin tape 23a exceeded 1.0 times the height h of the protuberance $18_2$, excessive pressure would be required because the protuberance $18_2$ would be brought directly into contact with the negative electrode substrate exposed portions 15. Therefore such thickness is not desirable.

Also, the width A of the opening $23_1$ in the central portion of the thermodeposited resin tape 23a will preferably be 1 to 5 times the width W of the protuberance $18_2$. If the width A of the opening $23_1$ in the center of the thermodeposited resin tape 23a were less than 1.0 times the width W of the protuberance $18_2$, the thermodeposited resin tape 23a might partially cover the tip portion of the protuberance $18_2$ and therefore the thermodeposited resin tape 23a residue would be liable to be left around the weld during resistance welding, which could result in explosive combustion and/or lowering of the weld strength and reliability. Also, if the width A of the opening $23_1$ in the center of the thermodeposited resin tape 23a exceeded 5 times the width W of the protuberance $18_2$, the situation would be essentially the same as that where there is no thermodeposited resin tape 23a and splashing of the spatter burr to the exterior could not be inhibited, with the result that internal short-circuits would increase.

Comparative Example

For the purposes of comparison, resistance welding was carried out in the same manner as in the working examples, but using an item other than the thermodeposited resin tape used in the working examples. Such comparative example corresponds to the related art case described earlier. In the comparative example the optimal welding current determined experimentally in advance was 5.7 kA. Slight amounts of copper spatter were observed to be present between the copper negative electrode substrate exposed portions 15 on the wound electrode assembly 11 after the resistance welding. Also, the peeling strength of the upper and lower electrode collectors after resistance welding in the comparative example was 19.6 N (20 kgf) as measured with a tensile tester.

The experimental observations and measurement results for the first working example and the comparative example are compiled in Table 1 below.

TABLE 1

|  | Spatter burr occurrence | Splashing of spatter burr to weld exterior | Weld strength Vs. related art | Current needed for welding Vs. related art |
|---|---|---|---|---|
| Related art case | Some | Some | — | — |
| 1st working example | Some | None | Equivalent to related art | 70% |

As is plain from Table 1, the optimal resistance welding current level for the first working example is around 70% of that in the related art case, but the tensile test results are equivalent. The reason why such results were obtained is inferred to be that the current during resistance welding in the working example was limited to flowing within a narrow extent by the opening $23_1$ in the thermodeposited resin tape $23a$, whereas in the related art case there was large reactive current not directly concerned with the resistance welding, due to the broad area over which the collector and collector-receiving part above and below contacted with the copper electrode substrate exposed portions.

Hence, it can be concluded that when the resistance welding is performed with the thermodeposited resin tape $23a$ present around the parts to be resistance-welded, there will be little splashing of metal spatter to the exterior because the metal spatter will be captured into the interior of the thermodeposited resin tape $23a$.

In the foregoing working example the case described is one where the negative electrode substrate exposed portions 15, negative electrode collector $18_1$ and negative electrode collector receiving part $18_3$ are all made of copper. However, because copper is the metal with the highest thermal conductivity among the metals commonly used as electrode substrates, applying the invention to cases where those items are made of other metals will result in even less splashing of the spattered burr to the exterior. Thus, it will be understood that with the present invention, a high-reliability sealed battery in which few internal short-circuits occur will be obtained no matter what the type of the sealed battery.

Second Working Example

In the prismatic nonaqueous electrolyte secondary battery 10 of the first working example, resistance welding was performed using a protuberance $18_2$ formed in the central portion of the negative electrode collector $18_1$ and an opening $23_1$ formed in the central portion of the thermodeposited resin tape $23a$, as shown in FIGS. 2 and 3. However, since the resistance welding bolt poles $24_1$ and $24_2$ will become hot, especially if resistance welding is performed continuously, the thermodeposited resin tape $23a$ itself could soften before the resistance welding current is applied. If resistance welding is performed under such conditions, the thermodeposited resin tape $23a$ itself could protrude out toward the weld, as shown in FIG. 5, due to the negative electrode collector $18_i$ and negative electrode collector receiving part $18_3$ being pushed together from both sides by the bolt poles $24_1$ and $24_2$ during the resistance welding. Under such conditions the thermodeposited resin could explosively combust when the resistance welding current is applied, depending on the case.

Accordingly, in the welded portion of the prismatic battery of the second working example, a flat-surfaced salient $18_4$ extending a height H toward the protuberance $18_2$ was formed on the side of the negative electrode collector receiving part $18_3$ that opposes the protuberance $18_2$ of the negative electrode collector $18_1$. Softened thermodeposited resin tape $23a$ would be unable to protrude out as far as the surface of the flat-surfaced salient $18_4$, and hence, explosive combustion of the thermodeposited resin tape $23a$ during welding was inhibited. The elements in FIGS. 6 and 7 that are structurally identical to those in FIGS. 2 and 3 are assigned the identical reference numerals and detailed descriptions thereof are omitted.

With the second working example, designating the thickness of the thermodeposited resin tape $23a$ as L and the height H of the flat-surfaced salient $18_4$, it will preferably be the case that $L<H<(3/2)L$. In other words, the height H of the flat-surfaced salient $18_4$ will be greater than the thickness L of the thermodeposited resin tape $23a$, so that the surface of the flat-surfaced salient $18_4$ will stick out more than the thermodeposited resin tape $23a$, and as a result, softened thermodeposited resin tape $23a$ will not protrude out as far as the surface of the flat-surfaced salient $18_4$. Also, if the height H of the flat-surfaced salient $18_4$ is less than 3/2 of the thickness L of the thermodeposited resin tape $23a$, the thermodeposited resin tape $23a$'s effect of capturing the spatter generated during resistance welding will be satisfactory. As for the relationships between the height h of the protuberance $18_2$ acting as a projection and the thickness L of the thermodeposited resin tape $23a$, and between the width W of the base portion of the protuberance $18_2$ and the width A of the opening $23_1$ in the center of the thermodeposited resin tape $23a$, it will suffice to determine these relationships so as to be the same as those in the first working example.

If given a circular shape viewed from above, the flat-surfaced salient $18_4$ will be easy to fabricate, and easy to position relative to the opening $23_1$ in the thermodeposited resin tape $23a$. Designating the diameter of such flat-surfaced salient $18_4$ as D, the diameter of the protuberance $18_2$'s base portion as W and the diameter of the opening $23_1$ in the thermodeposited resin tape $23a$ as A, preferably $W<D<A$. In such case, the layout relationship, as viewed from above, between the flat-surfaced salient $18_4$, the protuberance $18_2$ and the opening $23_1$ in the thermodeposited resin tape $23a$ will be as shown in FIG. 7.

Thus, when the prismatic battery resistance weld structure of the second working example is employed, no thermodeposited resin will enter between the protuberance $18_2$ and the flat-surfaced salient $18_4$ during resistance welding, and therefore the thermodeposited resin will be inhibited from explosively combusting.

Third Working Example

Although thermodeposited resin tape 23a was used as the insulating seal material in the first and second working examples, it is alternatively possible to use adhesive insulating tape. The structure of a resistance weld in the prismatic battery of a third working example, which uses adhesive insulating tape 23b as the insulating seal material, will now be described using FIGS. 8 to 10. The elements in FIGS. 8 to 10 that are structurally identical to those in FIGS. 6 and 7 are assigned the identical reference numerals and detailed descriptions thereof are omitted.

The sole respect in which the structure of the weld in the third working example differs from that of the weld in the second working example is that whereas thermodeposited resin tape 23a was used as the insulating seal material in the second working example, adhesive insulating tape 23b is used in the third working example; the other structural aspects are essentially identical. For such adhesive insulating tape 23b, use can be made of insulating tape 23c constituted of polyimide tape, polypropylene tape, polyphenylene sulfide tape or the like, one surface of which is coated with adhesive 23d. In the example, the adhesive insulating tape 23b employed had total thickness t=0.1 mm and the thickness a of its adhesive 23d was a=0.03 mm, while the height H of the flat-surfaced salient was H=0.10 mm, as H should preferably conform to the relation a<H<(3/2)t. More precisely, since the adhesive 23d is soft and therefore prone to change its shape, it is liable to protrude out from the insulating tape 23c when pressure is applied by the bolt poles $24_1$ and $24_2$ during resistance welding. But with a<H, the thickness a of the adhesive 23d is smaller than the height H of the flat-surfaced salient $18_4$ and therefore the adhesive will not cover over the flat-surfaced salient during resistance welding. Also, with H<(3/2)t, the spatter capturing effect during resistance welding will be good.

Regarding the relationships between the height h of the protuberance $18_2$ acting as a projection and the total thickness t of the adhesive insulating tape 23b and between the width W of the base portion of the protuberance $18_2$ and the width A of the opening $23_1$ in the center of the adhesive insulating tape 23b, as with the first working example, the total thickness t of the adhesive insulating tape 23b will preferably be 0.1 to 1.0 times the height h of the protuberance $18_2$, and the width A of the opening $23_1$ in the central portion of the adhesive insulating tape 23b will preferably be 1 to 5 times the width W of the protuberance $18_2$.

Although in the weld of the prismatic battery of the third working example, as in the weld of the second working example, a flat-surfaced salient $18_4$ extending a height H toward the protuberance $18_2$ was formed on the side of the negative electrode collector receiving part $18_3$ that opposes the protuberance $18_2$ of the negative electrode collector $18_1$, such flat-surfaced salient $18_4$ is not necessarily a needed element. But when adhesive insulating tape 23b is employed, unless the flat-surfaced salient $18_4$ is formed the adhesive 23d will be liable to protrude out from the insulating tape 23c toward the resistance weld upon application of pressure by the bolt poles $24_t$ and $24_2$ during resistance welding, as shown in FIG. 10. In order to assure safety therefore, it will be advisable to provide the flat-surfaced salient $18_4$.

Although in the foregoing first to third working examples the negative electrode collector $18_1$'s protuberance $18_2$, which serves as a projection, is of a shape such that the cross-sectional area of the tip portion is smaller than that of the base, the projection is not limited to such shape. Also, although in the foregoing second and third working examples a flat-surfaced salient $18_4$ extending a height H toward the protuberance $18_2$ was formed on the side of the negative electrode collector receiving part $18_3$ that opposes the protuberance $18_2$ of the negative electrode collector $18_1$, similar advantages will be obtained if such a projection is provided on both the negative electrode collector $18_1$ and the negative electrode collector receiving part $18_3$.

Although the foregoing first to third working examples are described as using a rectangular outer can, there is no particular restriction on the outer can shape, and a cylindrical outer can could alternatively be used. However, in the interest of efficient use of space in the equipment to which the battery is installed, a rectangular shaped outer can will preferably be used. Also, although the foregoing first to third working examples are described as using a flat wound electrode assembly, it would obviously be possible to use instead an electrode assembly of stacked plate-form positive and negative electrodes with separators interposed, or the like.

What is claimed is:

1. A method for manufacturing a sealed battery, comprising:
   forming an electrode assembly for the sealed battery having exposed portions of multiple positive electrode substrates at one end and having exposed portions of multiple negative electrode substrates at an other end;
   bringing a collector and a collector-receiving part that are resistance-welded on both sides of the positive or the negative electrode substrates, or of both, with an insulating seal material being disposed around the resistance-welded portions, between the substrates on the one hand and the collector or collector-receiving part, or both, on the other; and
   effecting resistance welding by passing current through the collector and collector-receiving part.

2. The method for manufacturing a sealed battery according to claim 1, wherein the insulating seal material is tape made of thermodeposited resin, or adhesive insulating tape.

3. The method for manufacturing a sealed battery according to claim 1, further comprising providing at least one of the collector and the collector-receiving part with a protuberance at the resistance-welded portion projecting toward the opposing collector or collector-receiving part, and bringing the protuberance into contact with a welding portion of the substrates in such a manner as to be positioned at the opening at the center of the insulating seal material.

4. The method for manufacturing a sealed battery according to claim 3, wherein the thickness of the insulating seal material is 0.1 to 1.0 times the height of the protuberance.

5. The method for manufacturing a sealed battery according to claim 3, wherein the width of the opening in the center of the insulating seal material is 1 to 5 times the width of the protuberance.

6. The method for manufacturing a sealed battery according to claim 3, wherein one of the collector and the collector-receiving part is provided with the protuberance at the resistance-welded portion projecting toward the opposing collector or collector-receiving part, and the opposing collector or collector-receiving part is provided with a flat-surfaced salient at a portion opposing to the protuberance, the protuberance and the flat-surfaced salient are brought against the welding portion of the substrates in such a manner as to be positioned opposing each other at the openings at the centers of the insulating seal material.

7. The method for manufacturing a sealed battery according to claim 6, wherein the flat-surfaced salient is of a circular shape viewed from above and has a diameter larger than that of the protuberance.

8. The method for manufacturing a sealed battery according to claim 6, wherein the thickness of the insulating seal material is 0.1 to 1.0 times the height of the protuberance.

9. The method for manufacturing a sealed battery according to claim 6, wherein the width of the opening in the center of the insulating seal material is 1 to 5 times the width of the protuberance.

10. The method for manufacturing a sealed battery according to claim 6, wherein the insulating seal material is tape made of thermodeposited resin, and, designating as L the thickness of the tape made of thermodeposited resin and as H the height of the flat-surfaced salient, L and H are in the range such that $L<H<(3/2)L$.

11. The method for manufacturing a sealed battery according to claim 6, wherein the insulating seal material is adhesive insulating tape, and, designating as t the total thickness of the adhesive insulating tape, as a the thickness of its adhesive, and as H the height of the flat-surfaced salient, t and a are in the range such that $a<H<(3/2)t$.

12. A method for manufacturing a sealed battery according to claim 1, wherein the insulating seal material that has an opening in the center being interposed is disposed to form the welded portion inside the opening.

13. A method for manufacturing a sealed battery according to claim 12, wherein the insulating seal material is disposed at both sides between the substrate and the collector and between the collector and the collector-receiving part.

* * * * *